(12) United States Patent
Michaud

(10) Patent No.: US 8,459,107 B1
(45) Date of Patent: Jun. 11, 2013

(54) MANIFOLD GAUGE COVER DEVICE

(76) Inventor: Michael J. Michaud, Holbrook, MA (US)

( * ) Notice: Subject to any disclaimer, the term of this patent is extended or adjusted under 35 U.S.C. 154(b) by 268 days.

(21) Appl. No.: 13/010,471

(22) Filed: Jan. 20, 2011

(51) Int. Cl.
*G01D 11/24* (2006.01)
*G01L 19/14* (2006.01)
*G01P 1/02* (2006.01)

(52) U.S. Cl.
USPC ............................... 73/431; 73/201

(58) Field of Classification Search
USPC ........................... 73/201, 273, 431
See application file for complete search history.

(56) References Cited

U.S. PATENT DOCUMENTS

| | | | |
|---|---|---|---|
| 4,197,747 A | 4/1980 | Koehler | |
| 5,058,758 A | 10/1991 | Suddeth | |
| 5,097,705 A | 3/1992 | Porter | |
| D356,273 S | 3/1995 | Pijut | |
| 5,567,883 A | 10/1996 | Nara | |
| 5,713,388 A | 2/1998 | Brewer | |
| 6,085,597 A | 7/2000 | Miller et al. | |
| 7,255,125 B2 | 8/2007 | Fancher | |
| 2008/0178473 A1* | 7/2008 | Liu | 30/277.4 |

OTHER PUBLICATIONS

Author: unknown, Title: Yellow Jacket, Refrigeration System Analyzer, Users Manual, Publisher: Ritchie Engineering Company, Inc, Date: Nov. 29, 2010 from WayBackMachine via http://web.archive.org/web/20101129221739/http://yellowjacket.com/product/928#yj-documents-tab, pp. 1-16.*

* cited by examiner

*Primary Examiner* — Harshad R Patel
*Assistant Examiner* — Roger Hernandez-Prewitt

(57) ABSTRACT

A manifold gauge cover featuring a first half shell and a second half shell connected via a hinge. The inner surfaces of the shells are lined with foam. The shells can move between an open position and a closed position respectively allowing and preventing access to the inner cavities of the shells. A locking mechanism secures the shells in the closed position. A gauge aperture is disposed in the back surfaces of the shells to allows passage of the hook of a manifold gauge set. A magnet is disposed on the bottom surface of a shell. A chart holder is disposed on the top surface of a shell adapted to hold a pressure temperature chart. When the half shells are in the closed position, the half shells cover a portion of a manifold gauge set.

5 Claims, 5 Drawing Sheets

MANIFOLD GAUGE COVER DEVICE

FIELD OF THE INVENTION

The present invention is directed to a covering for manifolds and gauges, more particularly to a protective covering for manifolds and gauges for helping to protect the manifolds and gauges from physical damage.

BACKGROUND OF THE INVENTION

Gauges and manifolds are subject to physical damage and must be replaced. The present invention features a manifold gauge cover device, which provides protection for a gauge set from physical damage. This can help a user save money by prolonging the life of the gauge or manifold.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

Figure 1:
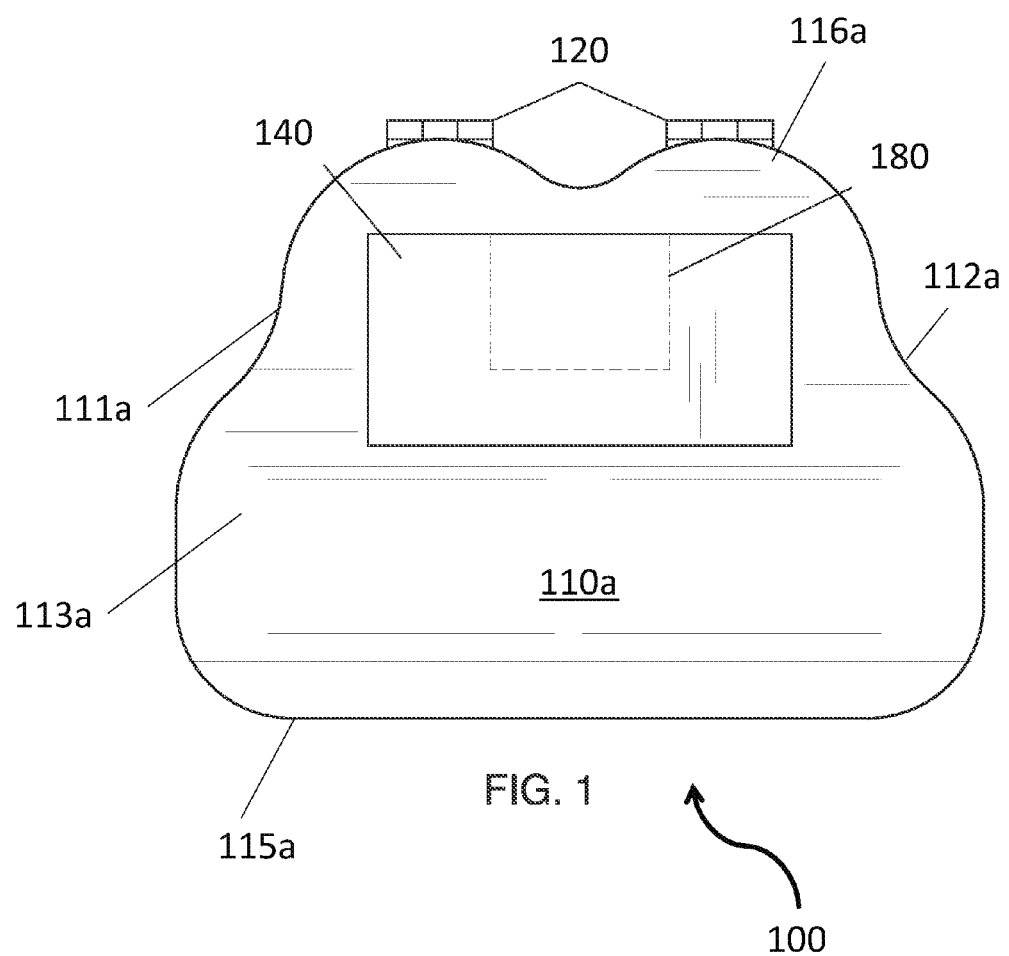
FIG. 1 is a front view of the manifold gauge cover device of the present invention.
Figure 2:
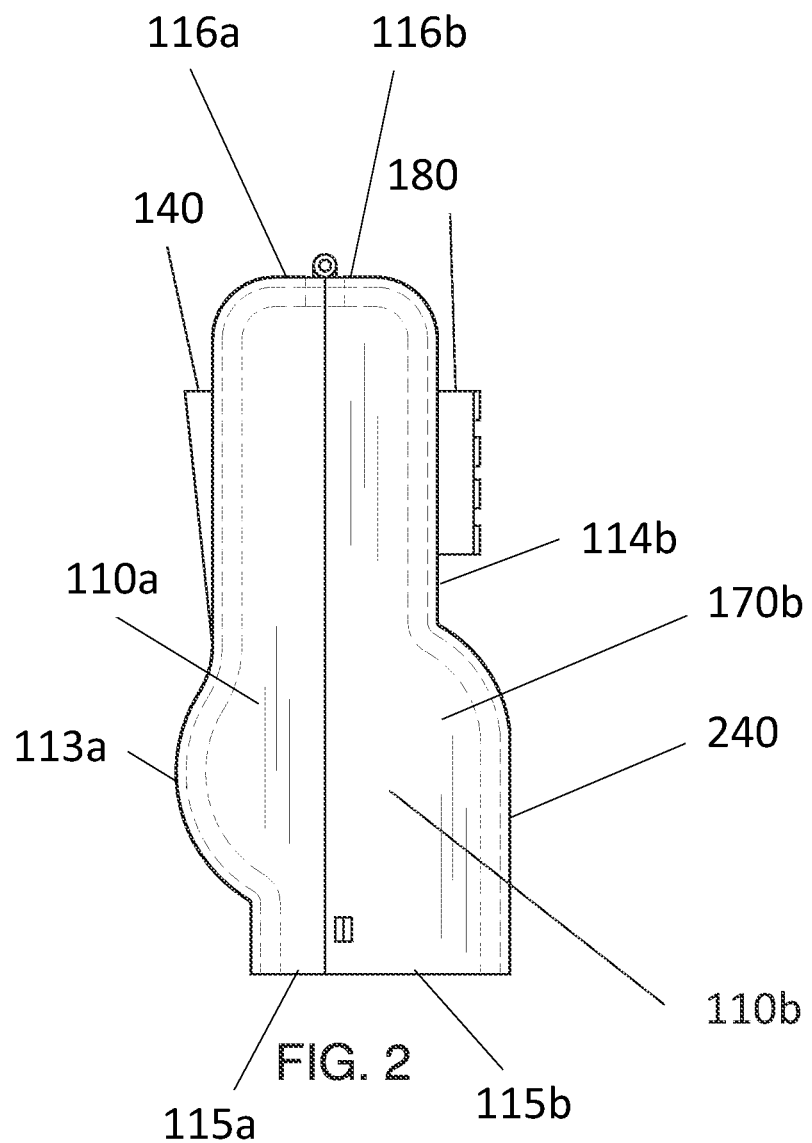
FIG. 2 is a side view of the manifold gauge cover device of FIG. 1.

The present invention features a manifold gauge cover device, which provides protection for a gauge set from physical damage. In some embodiments, the device comprises a first half shell, the first half shell is generally hollow and has a top surface, an open front portion, a back surface, and an inner cavity, an inner surface of the first shell is lined with foam; a second half shell, the second half shell is generally hollow and has a bottom surface, an open front portion, a back surface, and an inner cavity, an inner surface of the first shell is lined with foam, the open front portions of both half shells allow passage of hoses of a manifold gauge set; a hinge disposed at an intersection of the back surface of the first half shell and the back surface of the second half shell, the hinge connects the half shells together, the half shells can move between an open position and a closed position respectively allowing and preventing access to the inner cavities of the half shells; a locking mechanism for securing the half shells in the closed position; a gauge aperture disposed in the back surfaces of both half shells, the gauge aperture allows passage of a hook component of a manifold gauge set; a magnet is disposed on the bottom surface of the second half shell; and a chart holder disposed on the top surface of the first half shell adapted to hold a pressure temperature chart. When the half shells are in the closed position, the half shells cover a portion of a manifold gauge set.

In some embodiments, the locking mechanism is a clip mechanism, a snap mechanism, a buckle mechanism, a magnet mechanism, or a combination thereof. In some embodiments, the locking mechanism is disposed at or near the open front portions of the half shells. In some embodiments, the manifold gauge cover device further comprises a concave bulge disposed in both the half shells, the concave bulges are aligned with each other.

DESCRIPTION OF PREFERRED EMBODIMENTS

Referring now to FIGS. 1-5, the present invention features a manifold gauge cover device 100, which provides protection for a manifold gauge set 101 from physical damage. The cover device 100 comprises a first half shell 110a and a second half shell 110b. The first half shell 110a is generally hollow and has a top surface 113a, a first side 111a, a second side 112a, an open front portion 115a, a back surface 116a, and an inner cavity. The second half shell 110b is generally hollow and has a bottom surface 114b, a first side, a second side, an open front portion 115b, a back surface 116b, and an inner cavity.

Figure 3:
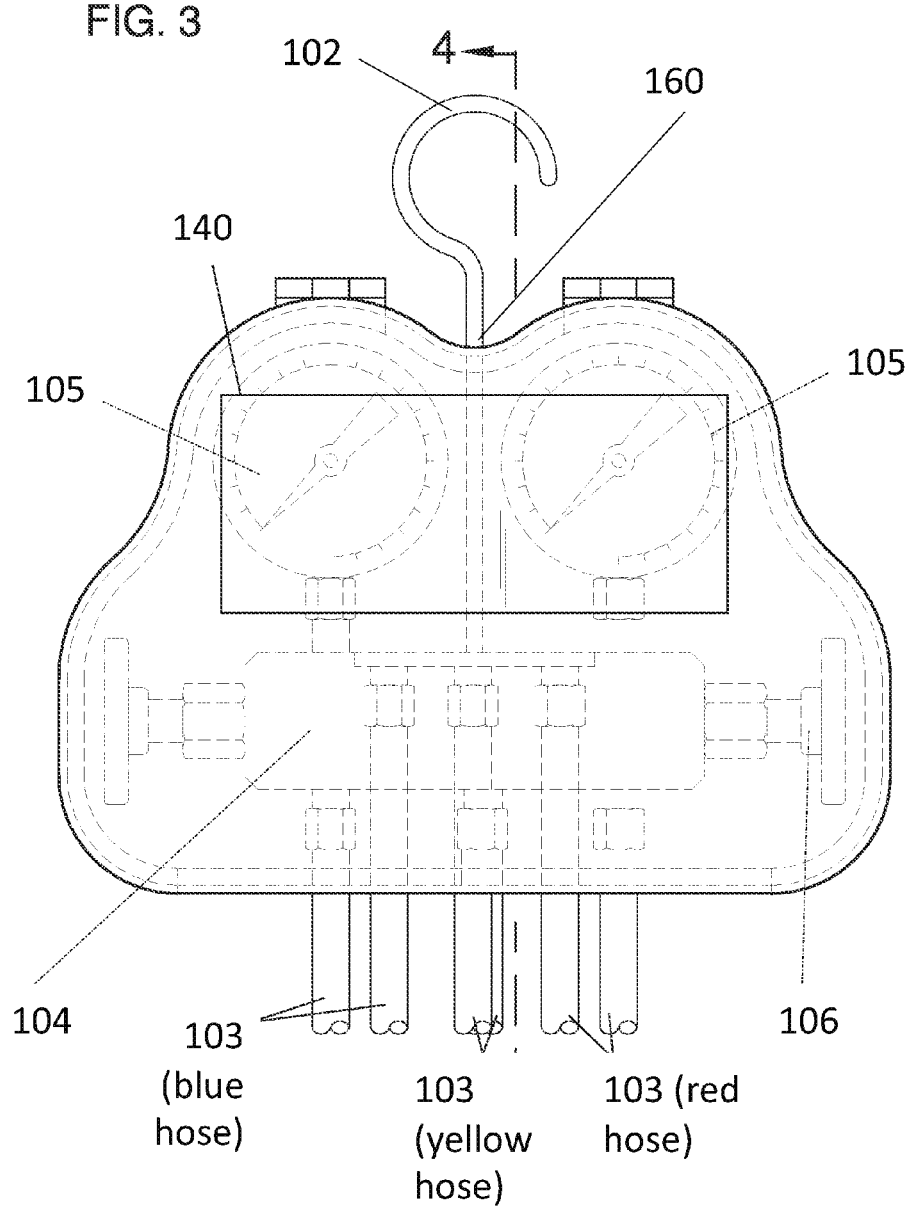
FIG. 3 is an in-use view (e.g., front internal view) of the manifold gauge cover device of the present invention.

The half shells 110a, 110b are connected together at the respective back surfaces 116 of each half shell 110a, 110b via a hinge 120 (or pair of hinges). The half shells 110a, 110b can move between an open position and a closed position respectively allowing and preventing access to the inner cavities of the half shells 110a, 110b. In some embodiments, the device 100 comprises a locking mechanism 130 for securing the half shells 110a, 110b in the closed position. The locking mechanism 130 may include a clip mechanism, a snap mechanism, a buckle mechanism, a magnet mechanism, the like, or a combination thereof. The locking mechanism 130 may be disposed at or near the open front portions 115 of the half shells 110a, 110b. When the half shells 110a, 110b are in the closed position, the half shells 110a, 110b cover a portion of the manifold gauge set 101 (e.g., see FIG. 3, FIG. 4). For example, FIG. 3 shows the manifold 104, gauges 105, and gauge handles 106 covered by the half shells 110a, 110b.

Disposed on the top surface 113a of the first half shell 110a is a chart holder 140. The chart holder 140 is adapted to hold various charts, for example a pressure temperature chart or the like. Such charts are well known to one of ordinary skill in the art. The chart holder 140 may be configured to allow the chart to be slid into the chart holder 140 and snugly held by the chart holder 140.

A gauge aperture 160 is disposed in the back surfaces 116 of both the half shells 110a, 110b. The gauge aperture 160 allows passage of the gauge set 101, for example the hook component 102 of the gauge set 101 (e.g., see FIG. 3). The open front portions 115 of the half shells 110 also allow passage of a portion of the gauge set 101, for example hoses 103 (e.g., see FIG. 3, FIG. 4).

A first clearance bulge 170 is disposed in the first half shell 110a. The first clearance bulge 170 is a generally convex outward bulge adapted to accommodate a portion of the gauge set 101 (e.g., see FIG. 4). A second clearance bulge 170b is disposed in the bottom surface 114b of the second half shell 110b. The second clearance bulge 170b is a generally convex outward bulge in the bottom surface 114b allowing passage of the hoses of the manifold and allowing for a portion of the gauge set 101 to fit inside the device 100 (e.g., see FIG. 2 and FIG. 4). The bulges 170 may be aligned with each other.

Figure 4:
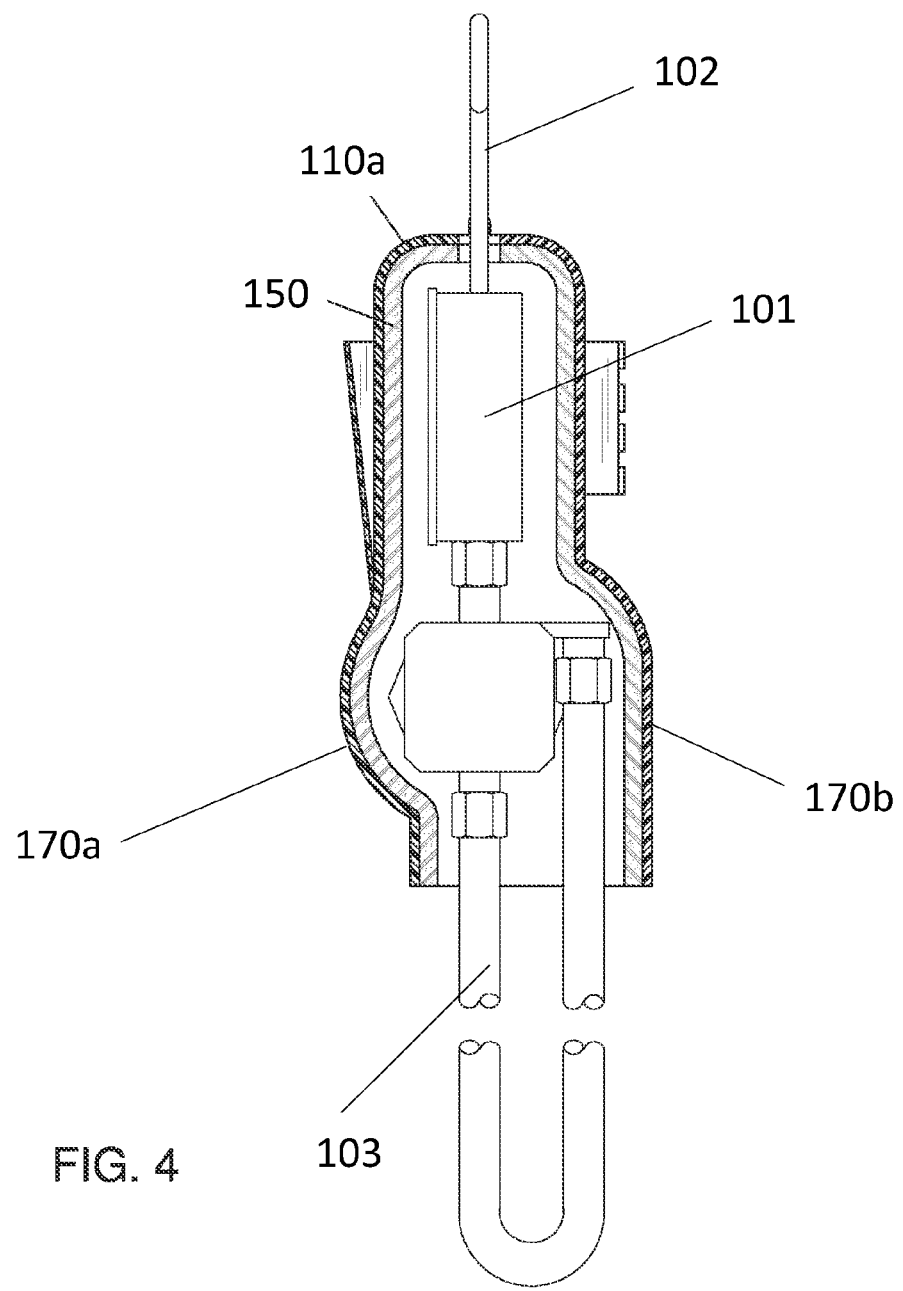
FIG. 4 is an in-use view (e.g., side cross sectional view) of the manifold gauge cover device of FIG. 3. The device is in the closed position.
Figure 5:
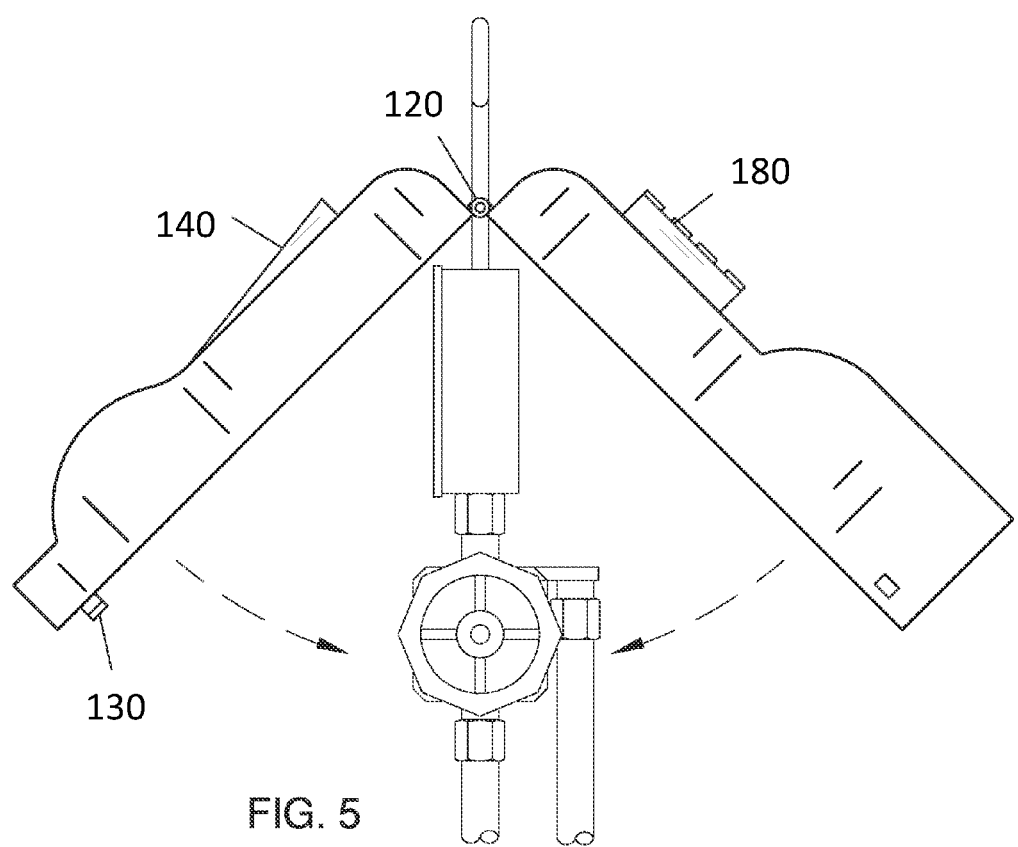
FIG. 5 is an in-use view (e.g., side view) of the manifold gauge cover device of the present invention. The device is in the open position.

The inner surfaces of both the first shell 110a and the second shell 110b are lined with foam 150 (e.g., see FIG. 4).

The foam 150 helps provide a cushioning support network for the gauge set 101. In some embodiments, a magnet 180 is disposed on the bottom surface 114b of the second half shell 110b.

The device 100 of the present invention may be constructed in a variety of shapes, sizes, and colors. In some embodiments, the device 100 is about 10 inches in width as measured from the first side 111a to the second side 112a of the first half shell 110a. In some embodiments, the device 100 is between about 8 to 16 inches in width as measured from the first side 111a to the second side 112a of the first half shell 110a. In some embodiments, the device 100 is about 8 inches in height as measured from the front portion 115a to the back surface 116a of the first half shell 110a. In some embodiments, the device 100 is between about 5 to 12 inches in height as measured from the front portion 115a to the back surface 116a of the first half shell 110a. The present invention is not limited to the aforementioned dimensions.

As used herein, the term "about" refers to plus or minus 10% of the referenced number. For example, an embodiment wherein the device 100 is about 10 inches in width includes a device 100 that is between 9 and 11 inches in width.

The disclosures of the following U.S. Patents are incorporated in their entirety by reference herein: U.S. Pat. No. 7,255,125; U.S. Pat. No. 5,713,388; U.S. Pat. No. 5,097,705; U.S. Pat. No. 5,058,758; U.S. Pat. No. 4,197,747; U.S. Pat. No. 6,085,597; U.S. Pat. No. 5,567,883; U.S. Design Pat. No. D356,273.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A manifold gauge cover device comprising:
   (a) a first half shell 110a, the first half shell 110a is generally hollow and has a top surface 113a, an open front portion 115a, a back surface 116a, and an inner cavity, an inner surface of the first shell 110a is lined with foam 150;
   (b) a second half shell 110b, the second half shell 110b is generally hollow and has a bottom surface 114b, an open front portion 115b, a back surface 116b, and an inner cavity, an inner surface of the first shell 110a is lined with foam 150, the open front portions 115 of both half shells 110a, 110b allow passage of hoses 103 of a manifold gauge set 101;
   (c) a hinge 120 disposed at an intersection of the back surface 116a of the first half shell 110a and the back surface 116b of the second half shell 110b, the hinge 120 connects the half shells 110a, 110b together, the half shells 110a, 110b can move between an open position and a closed position respectively allowing and preventing access to the inner cavities of the half shells 110a, 110b;
   (d) a locking mechanism 130 for securing the half shells 110a, 110b in the closed position;
   (e) a gauge aperture 160 disposed in the back surfaces 116 of both half shells 110a, 110b, the gauge aperture 160 allows passage of a hook component 102 of a manifold gauge set 101;
   (f) a magnet 180 is disposed on the bottom surface 114b of the second half shell 110b; and
   (g) a chart holder 140 disposed on the top surface 113a of the first half shell 110a adapted to hold a pressure temperature chart;
wherein when the half shells 110a, 110b are in the closed position, the half shells 110a, 110b cover a portion of a manifold gauge set 101.

2. The manifold gauge cover device of claim 1, wherein the locking mechanism 130 is a clip mechanism, a snap mechanism, a buckle mechanism, a magnet mechanism, or a combination thereof.

3. The manifold gauge cover device of claim 1, wherein the locking mechanism 130 is disposed at or near the open front portions 115 of the half shells 110a, 110b.

4. The manifold gauge cover device of claim 1 further comprising a first clearance bulge 170a disposed in the first half shell 110a.

5. The manifold gauge cover device of claim 1 further comprising a second clearance bulge 170b disposed in the second half shell 110b.

* * * * *